United States Patent
Oh et al.

(10) Patent No.: US 12,483,791 B2
(45) Date of Patent: Nov. 25, 2025

(54) CAMERA DEVICE HAVING FIRST AND SECOND MAGNETS OF DIFFERENT SIZES

(71) Applicant: LG INNOTEK CO., LTD., Seoul (KR)

(72) Inventors: Jung Seok Oh, Seoul (KR); Hyeon Jun Jang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 113 days.

(21) Appl. No.: 18/562,410

(22) PCT Filed: May 13, 2022

(86) PCT No.: PCT/KR2022/006888
§ 371 (c)(1),
(2) Date: Nov. 20, 2023

(87) PCT Pub. No.: WO2022/245058
PCT Pub. Date: Nov. 24, 2022

(65) Prior Publication Data
US 2024/0244324 A1    Jul. 18, 2024

(30) Foreign Application Priority Data
May 21, 2021 (KR) .................. 10-2021-0065814

(51) Int. Cl.
*H04N 5/335* (2011.01)
*G03B 5/04* (2021.01)
(Continued)

(52) U.S. Cl.
CPC ............ *H04N 23/687* (2023.01); *G03B 5/04* (2013.01); *H04N 23/51* (2023.01); *H04N 23/54* (2023.01);
(Continued)

(58) Field of Classification Search
CPC .............................................. G03B 2205/0007
See application file for complete search history.

(56) References Cited

U.S. PATENT DOCUMENTS 12,010,427 B2 *  6/2024  Oh ...................... G02B 13/0065
12,181,789 B2 * 12/2024  Oh ........................... G03B 5/00
(Continued)

FOREIGN PATENT DOCUMENTS

JP       2011-65140 A      3/2011
KR   10-2019-0061439 A     6/2019
(Continued)

OTHER PUBLICATIONS

International Search Report dated Aug. 18, 2022 in International Application No. PCT/KR2022/006888.

*Primary Examiner* — Gary C Vieaux
(74) *Attorney, Agent, or Firm* — Saliwanchik, Lloyd & Eisenschenk

(57) ABSTRACT

The present embodiment relates to a camera device comprising: a fixed part; a first moving part disposed inside the fixed part and including a lens; a second moving part disposed below the first moving part and including an image sensor; a first magnet and a second magnet disposed in the fixed part; a first coil positioned in the first moving part so as to correspond to the first magnet; and a second coil positioned in the second moving part so as to correspond to the second magnet, wherein the first magnet and the second magnet are of different sizes, and at least a portion of the first magnet overlaps the second magnet in a direction parallel to the outer surface of a first side wall of the fixed part.

20 Claims, 13 Drawing Sheets

(51) Int. Cl.
*H04N 23/51* (2023.01)
*H04N 23/54* (2023.01)
*H04N 23/55* (2023.01)
*H04N 23/57* (2023.01)
*H04N 23/68* (2023.01)

(52) U.S. Cl.
CPC ............. *H04N 23/55* (2023.01); *H04N 23/57* (2023.01); *G03B 2205/0007* (2013.01)

(56) References Cited

U.S. PATENT DOCUMENTS

| | | | |
|---|---|---|---|
| 2016/0320584 A1* | 11/2016 | Lee | G02B 27/646 |
| 2022/0137486 A1* | 5/2022 | Oh | G02B 7/08 |
| | | | 359/554 |
| 2022/0191359 A1* | 6/2022 | Oh | H04N 23/51 |

FOREIGN PATENT DOCUMENTS

| | | |
|---|---|---|
| KR | 10-2020-0083953 A | 7/2020 |
| KR | 10-2020-0088729 A | 7/2020 |
| KR | 10-2021-0026659 A | 3/2021 |

\* cited by examiner

CAMERA DEVICE HAVING FIRST AND SECOND MAGNETS OF DIFFERENT SIZES

CROSS-REFERENCE TO RELATED APPLICATIONS

This application is the U.S. national stage application of International Patent Application No. PCT/KR2022/006888, filed May 13, 2022, which claims the benefit under 35 U.S.C. § 119 of Korean Application No. 10-2021-0065814, filed May 21, 2021, the disclosures of each of which are incorporated herein by reference in their entirety.

TECHNICAL FIELD

The present embodiment relates to a camera device.

BACKGROUND ART

A camera device is a device that photographs a picture or video of a subject, and is installed in optical devices such as smartphones, drones, and vehicles.

In camera devices, there is a demand for hand shake correction (OIS) function for correcting image shake caused by user's movement to improve image quality.

In a camera device, the hand shake correction function is performed by moving the lens in a direction perpendicular to the optical axis. However, in accordance with the recent trend of high pixelation, the diameter of the lens increases, and the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that moves an image sensor to perform a hand shake correction function.

The present embodiment is intended to provide a camera device that drives the image sensor in three axes: x-axis shift, y-axis shift, and z-axis rolling.

Technical Solution

A camera device according to the present embodiment comprises: a fixed part; a first moving part being disposed inside the fixed part and comprising a lens; a second moving part being disposed below the first moving part and comprising an image sensor; a first magnet and a second magnet being disposed in the fixed part; a first coil being disposed in the first moving part at a position corresponding to the first magnet; and a second coil being disposed in the second moving part at a position corresponding to the second magnet, wherein the sizes of the first magnet and the second magnet are different, and wherein at least a portion of the first magnet may be overlapped with the second magnet in a direction parallel to an outer lateral surface of a first lateral wall of the fixed part.

The first magnet may be formed separately from the second magnet to be spaced apart from the second magnet.

The thickness of the second magnet in an optical axis direction may be thinner than the thickness of the first magnet.

The second magnet comprises four second magnets and the first magnet comprises two first magnets, wherein the four second magnets are respectively disposed in four corner areas of the fixed part, and wherein the two first magnets may be disposed between the four second magnets.

The fixed part comprises a base and a housing being fixed to the base, wherein the first magnet and the second magnet are disposed in the housing, and wherein the housing may be formed as one piece.

The first moving part comprises a bobbin to which the lens is coupled, wherein the first coil may be disposed around an outer peripheral surface of the bobbin.

It comprises an upper elastic member and a lower elastic member connecting the housing and the bobbin, wherein the lower elastic member may be disposed below the upper elastic member.

It comprises a first substrate and a wire, wherein the second moving part comprises a second substrate being electrically connected to the image sensor, and wherein the wire may electrically connect the first substrate and the second substrate.

The second moving part comprises a holder being disposed in the second substrate, wherein the second coil may be disposed in the holder and coupled to the second substrate by solder.

The second moving part comprises a body portion being disposed in the holder and a terminal member comprising a terminal being disposed in the body portion, wherein the terminal may comprise a first portion being disposed in the body portion, a second portion being extended to one side from the first portion and being coupled to the wire, and a third portion being extended from the first portion to the other side and being coupled to the second substrate.

The second moving part comprises a sensor substrate being disposed below the second substrate, wherein the second substrate comprises a hole, and wherein the image sensor is disposed in the sensor substrate and may be disposed in the hole of the second substrate.

The camera device may comprise: a sensing magnet and a correction magnet being disposed opposite to each other in the first moving part; Sensing substrate; and a driver IC being disposed in the sensing substrate and comprising a sensor for detecting the sensing magnet.

The lower elastic member comprises two lower elastic members being spaced apart from each other, wherein the two lower elastic members may electrically connect the sensing substrate and the first coil.

The first coil moves the first moving part in an optical axis direction through interaction with the first magnet, and the second coil moves the second moving part in a direction perpendicular to the optical axis through interaction with the second magnet and may rotate it with respect to an optical axis.

An optical device according to the present embodiment may comprise: a main body; a camera device being disposed on the main body; and a display being disposed in the main body and outputting a video or image photographed by the camera device.

A camera device according to the present embodiment comprises: a housing; a bobbin being disposed inside the housing; a lens being coupled to the bobbin; an image sensor being disposed at a position corresponding to the lens; a first driving unit for moving the lens in an optical axis direction and comprising a first magnet; and a second driving unit for moving the image sensor in a direction perpendicular to the optical axis and comprising a second magnet, wherein the first magnet is disposed in a first area of the first lateral wall of the housing, wherein the second magnet is disposed in a second area of the first lateral wall of the housing, and wherein the length of the major axis of the first magnet may be greater than the length of the major axis of the second magnet.

At least a portion of the first magnet may be overlapped with the second magnet in a direction parallel to the outer lateral surface of the first lateral wall of the housing.

The first area may comprise a central area of the first lateral wall of the housing in a direction parallel to the optical axis direction.

The first magnet may have two polarities, and the second magnet may have four polarities.

The camera device according to the present embodiment comprises: a fixed part; a first moving part being disposed inside the fixed part and comprising a lens; a second moving part being disposed below the first moving part and comprising an image sensor; a first magnet and a second magnet being disposed in the fixed part; a first coil being disposed in the first moving part at a position corresponding to the first magnet; and a second coil being disposed in the second moving part at a position corresponding to the second magnet, wherein the first magnet comprises a first unit magnet being disposed in the central area of the first lateral wall of the fixed part, wherein the second magnet comprises a first unit magnet being disposed in the first lateral wall of the fixed part, and wherein the first unit magnet of the first magnet may be spaced apart from the first unit magnet of the second magnet.

At least a portion of the first magnet may be overlapped with the second magnet in a direction parallel to an outer lateral surface of the first lateral wall of the fixed part.

Each of the first unit magnet of the first magnet and the first unit magnet of the second magnet may be disposed in a major axis direction of the magnet.

The second magnet comprises a second unit magnet being disposed in the first lateral wall of the fixed part, and the first unit magnet of the first magnet may be disposed between the first unit magnet and the second unit magnet of the second magnet.

The second unit magnet of the second magnet may be disposed in the first lateral wall of the fixed part in a minor axis direction.

In a direction parallel to the outer lateral surface of the first lateral wall of the fixed part, the shortest distance between the first unit magnet of the first magnet and the first unit magnet of the second magnet may be smaller than the shortest distance between the first unit magnet of the first magnet and the second unit magnet of the second magnet.

Advantageous Effects

Through the present embodiment, the hand shake correction function can be performed by moving the image sensor.

In the present embodiment, the height dimension of the camera device can be reduced through integration of support parts supporting the AF magnet and the OIS magnet. That is, the shoulder height of the camera device may be reduced. Furthermore, the material cost of the magnet support parts can be reduced.

BRIEF DESCRIPTION OF DRAWINGS

FIG. 15 is a diagram illustrating driving in which an image sensor of a camera device according to the present embodiment is shifted along an x-axis. FIG. 16 is a diagram illustrating driving in which an image sensor of a camera device is shifted along a y-axis according to the present embodiment. FIG. 17 is a diagram for explaining the driving in which an image sensor of a camera device according to the present embodiment is rolling about a z-axis.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, a camera device according to the present embodiment will be described with reference to the drawings.

Figure 1:
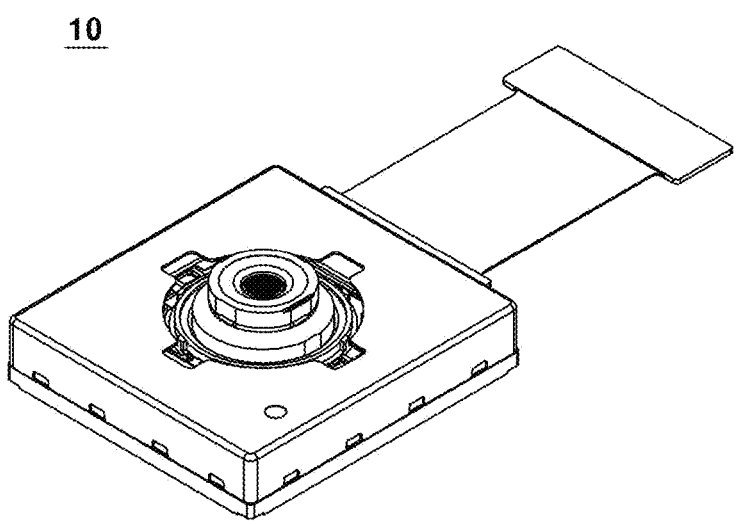
FIG. 1 is a perspective view of a camera device according to the present embodiment.
Figure 2:
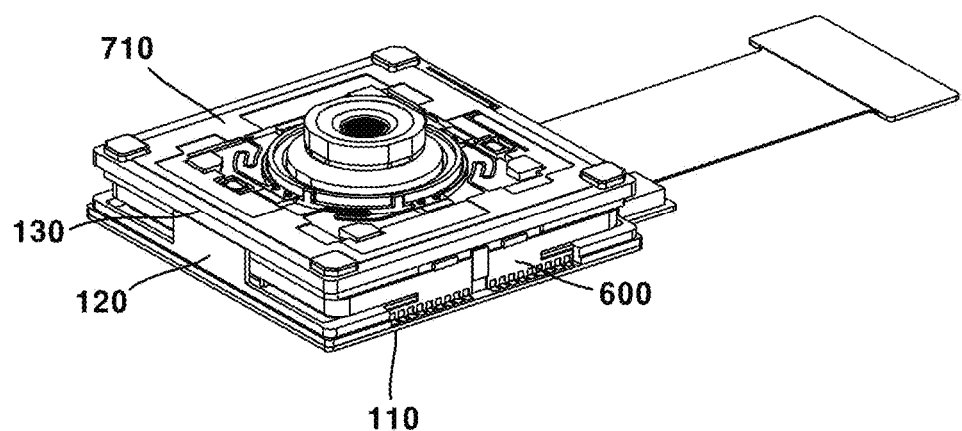
FIG. 2 is a perspective view of a state in which a cover member is omitted from a camera device according to the present embodiment.
Figure 3:
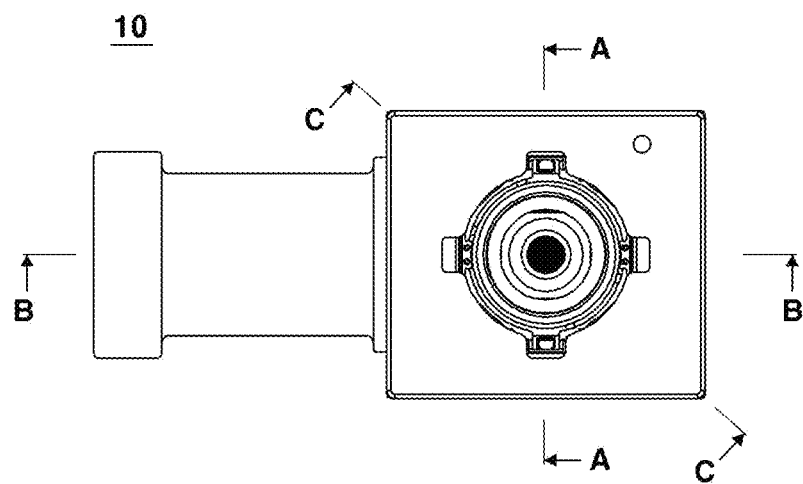
FIG. 3 is a plan view of a camera device according to a first embodiment of the present embodiment.
Figure 4:
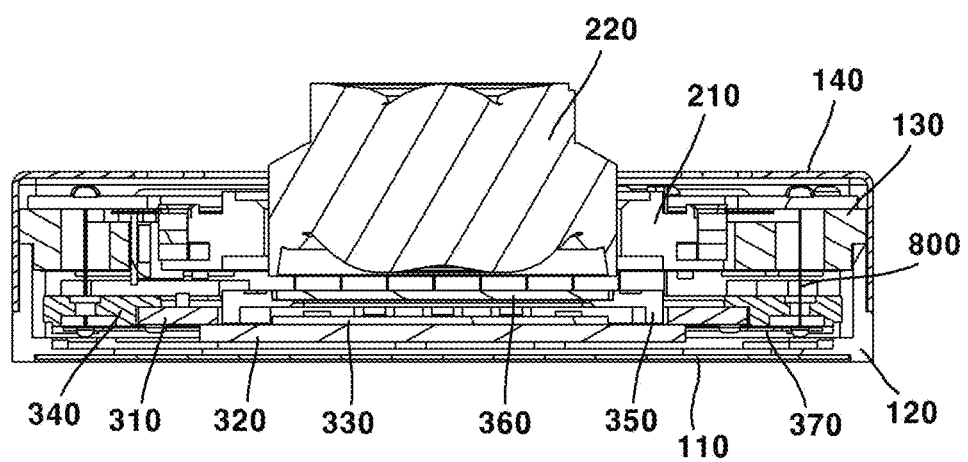
FIG. 4 is a cross-sectional view taken along line A-A in FIG. 3.
Figure 5:
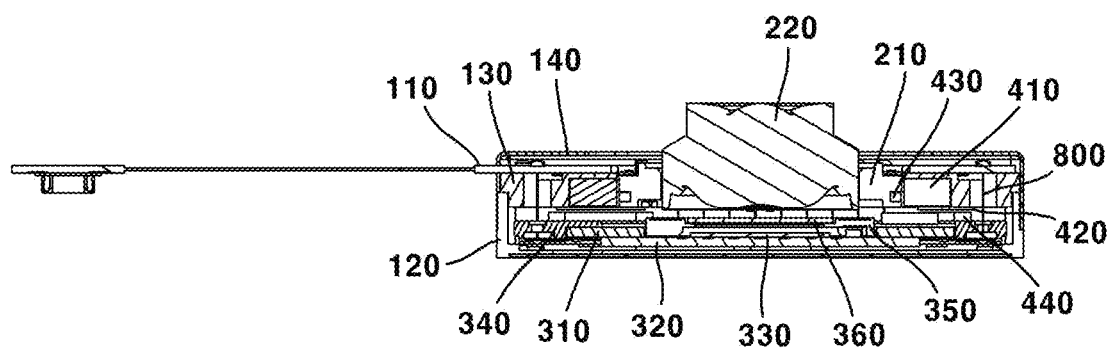
FIG. 5 is a cross-sectional view taken along line B-B in FIG. 3.
Figure 6:
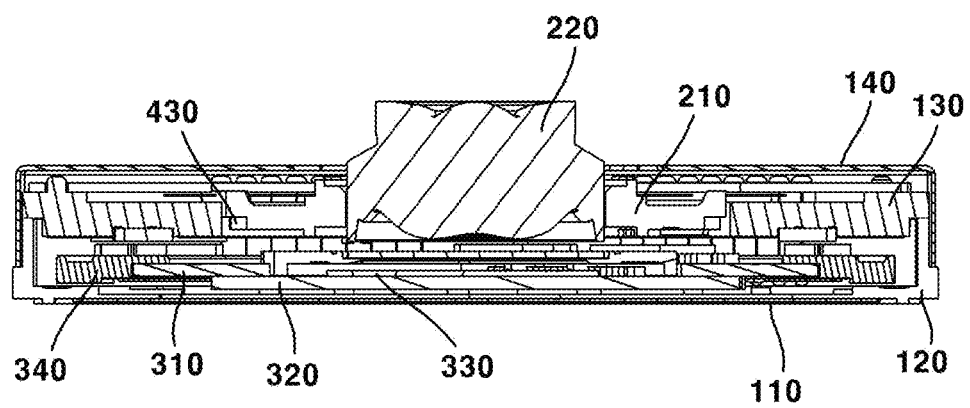
FIG. 6 is a cross-sectional view taken along line C-C in FIG. 3.
Figure 7:
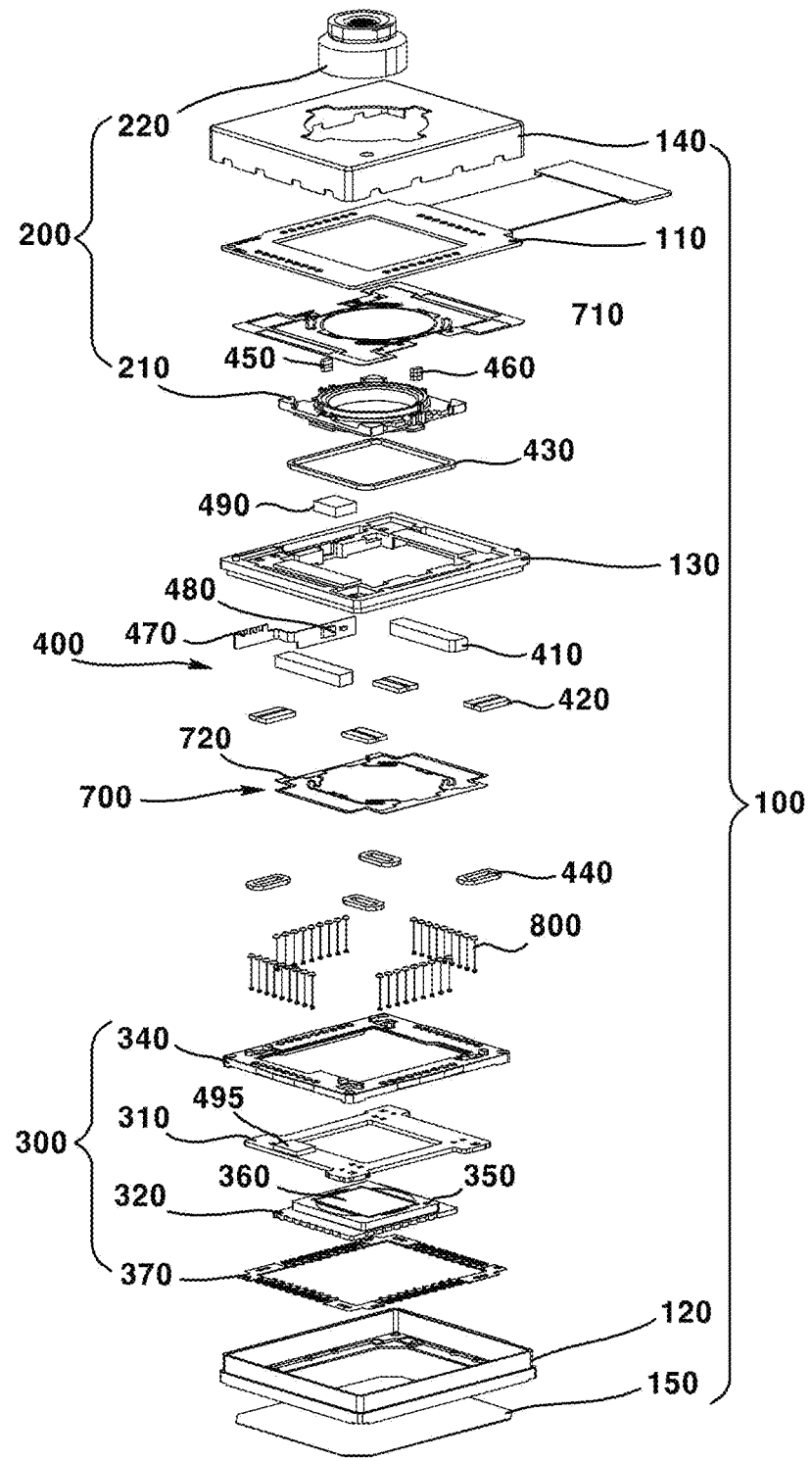
FIG. 7 is an exploded perspective view of a camera device according to the present embodiment.
Figure 8:
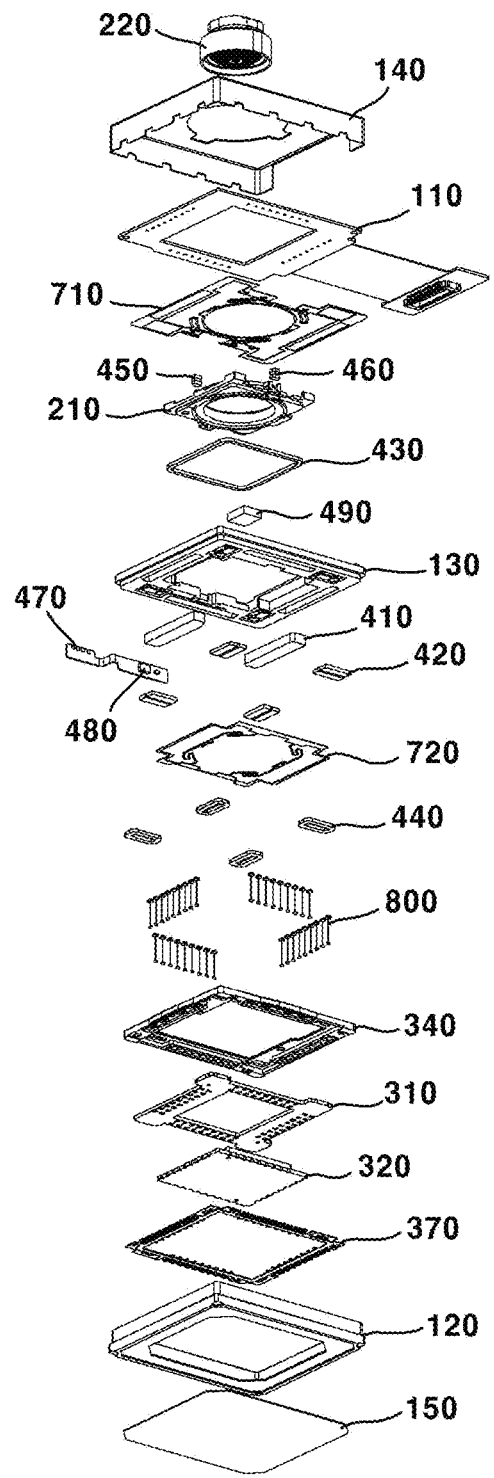
FIG. 8 is an exploded perspective view of a camera device according to the present embodiment viewed from a direction different from that of FIG. 7.
Figure 9:
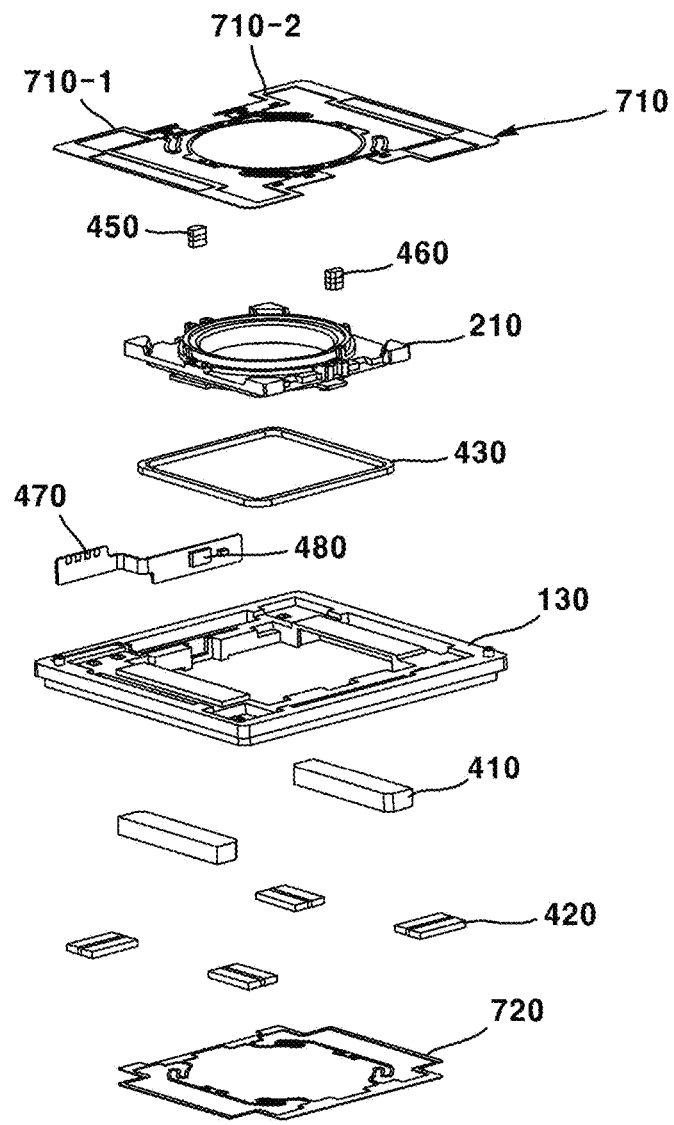
FIG. 9 is an exploded perspective view of a first moving part and related components of a camera device according to the present embodiment.
Figure 10:
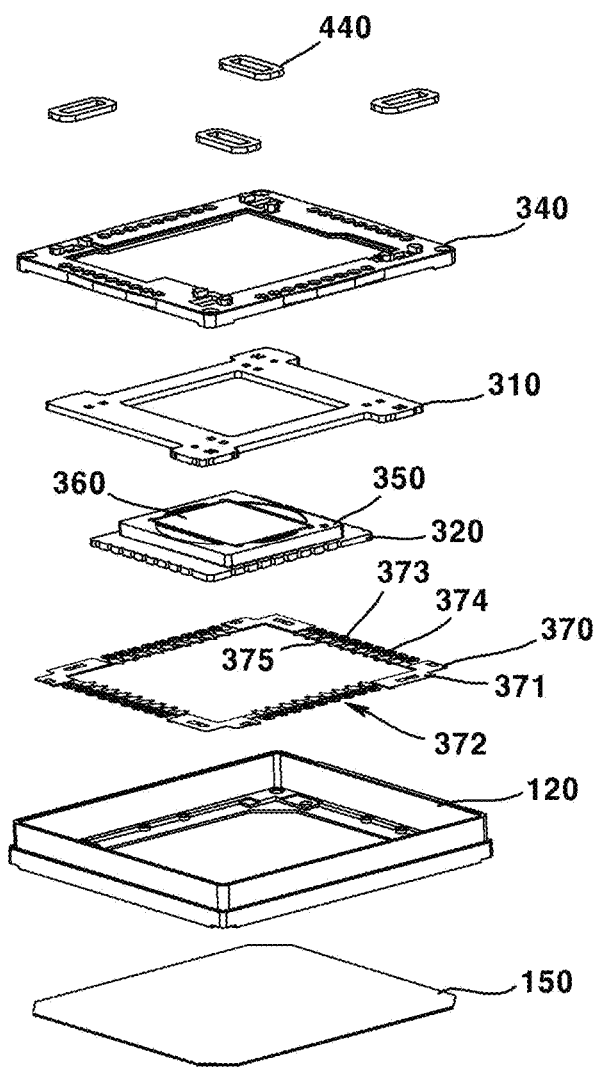
FIG. 10 is an exploded perspective view of a second moving part and related components of a camera device according to the present embodiment.
Figure 11:
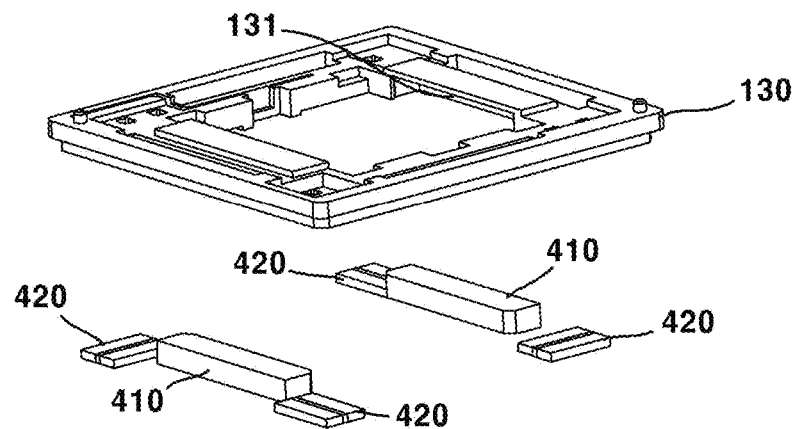
FIG. 11 is an exploded perspective view illustrating a housing and first magnet and second magnets of a camera device according to the present embodiment.
Figure 12:
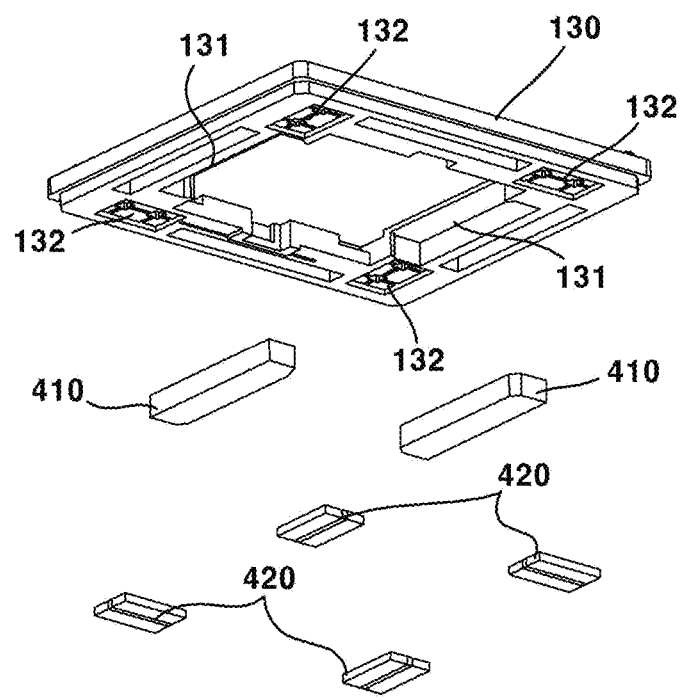
FIG. 12 is an exploded perspective view of a housing and first and second magnets of a camera device according to the present embodiment, viewed from a direction different from that of FIG. 11.
Figure 13:
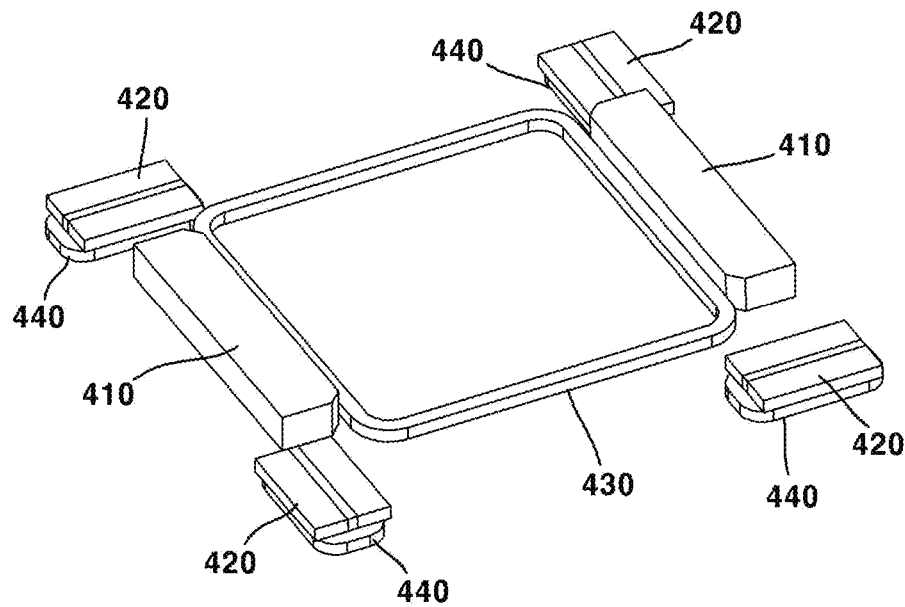
FIG. 13 is a perspective view illustrating a magnet and a coil of a camera device according to the present embodiment.

FIG. 1 is a perspective view of a camera device according to the present embodiment; FIG. 2 is a perspective view of a state in which a cover member is omitted from a camera device according to the present embodiment; FIG. 3 is a plan view of a camera device according to a first embodiment of the present embodiment; FIG. 4 is a cross-sectional view taken along line A-A in FIG. 3; FIG. 5 is a cross-sectional view taken along line B-B in FIG. 3; FIG. 6 is a cross-sectional view taken along line C-C in FIG. 3; FIG. 7 is an exploded perspective view of a camera device according to the present embodiment; FIG. 8 is an exploded perspective view of a camera device according to the present embodiment viewed from a direction different from that of FIG. 7; FIG. 9 is an exploded perspective view of a first moving part and related components of a camera device according to the present embodiment; FIG. 10 is an exploded perspective view of a second moving part and related components of a camera device according to the present embodiment; FIG. 11 is an exploded perspective view illustrating a housing and first magnet and second magnets of a camera device according to the present embodiment; FIG. 12 is an exploded perspective view of a housing and first and second magnets of a camera device according to the present embodiment, viewed from a direction different from that of FIG. 11; and FIG. 13 is a perspective view illustrating a magnet and a coil of a camera device according to the present embodiment.

The camera device 10 can photograph one or more of images and videos. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a hand shake correction assembly. The camera device 10 may comprise an auto focus device. The camera device 10 may comprise a hand shake correction device. The camera device 10 may comprise an actuator. The camera device 10 may comprise a lens driving actuator. The camera device 10 may comprise a sensor driving actuator. The camera device 10 may comprise an auto focus actuator. The camera device 10 may comprise a hand shake correction actuator.

The camera device 10 may comprise a fixed part 100. The fixed part 100 may be a relatively fixed portion when the moving parts 200 and 300 move. The fixed part 100 may be a relatively fixed portion when at least one of the first moving part 200 and the second moving part 300 moves. The fixed part 100 may accommodate the first moving part 200 and the second moving part 300. The fixed part 100 may be disposed outside the first moving part 200 and the second moving part 300.

The camera device 10 may comprise a first substrate 110. The fixed part 100 may comprise the first substrate 110. The first substrate 110 may be a main substrate. The first substrate 110 may be a substrate. The first substrate 110 may be a printed circuit board (PCB). The first substrate 110 may be connected to power of the optical device 1. The first substrate 110 may comprise a connector connected to power of the optical device 1.

Throughout the specification, the first substrate 110 has been described as one component of the fixed part 100, but the first substrate 110 may be understood as a component separate from the fixed part 100.

The camera device 10 may comprise a base 120. The fixed part 100 may comprise a base 120. The base 120 may be disposed below housing 130. The base 120 may be fixed to housing 130. The base 120 may be coupled to housing 130. The base 120 may be disposed below the first substrate 110 and the base 120 may be fixed to the first substrate 110. The base 120 may be coupled to the first substrate 110.

The camera device 10 may comprise a housing 130. The fixed part 100 may comprise a housing 130. The housing 130 may be disposed in base 120. The housing 130 may be disposed on base 120. The housing 130 may be disposed above the base 120. The housing 130 may be fixed to the base 120. The housing 130 may be coupled to base 120. The housing 130 may be attached to the base 120 by an adhesive. The housing 130 may be disposed on the first substrate 110. The housing 130 may be disposed below the first substrate 110. The housing 130 may be formed as a separate member from the base 120. The housing 130 may be formed as one piece.

The camera device 10 may comprise a cover member 140. The fixed part 100 may comprise a cover member 140. The cover member 140 may be coupled to the base 120. The cover member 140 may be coupled to the housing 130. The cover member 140 may be fixed to the base 120. The cover member 140 may cover at least a portion of the base 120. The cover member 140 may cover at least a portion of the housing 130.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole being formed in an upper plate. The hole may be formed at a position corresponding to the lens 220. The cover member 140 may comprise a side plate. The side plate may comprise a plurality of side plates. The side plate may comprise four side plates. The side plate may comprise first to fourth side plates. The side plates may comprise first and second side plates being disposed opposite to each other, and third and fourth side plates being disposed opposite to each other. The cover member 140 may comprise a plurality of corners between pluralities of side plates.

Throughout the specification, the cover member 140 has been described as one component of the fixed part 100, but the cover member 140 may be understood as a separate component from the fixed part 100. The cover member 140 may be coupled with the fixed part 100. The cover member 140 may cover the first moving part 200.

The camera device 10 may comprise a first moving part 200. The first moving part 200 may move against the fixed part 100. The first moving part 200 may move in an optical axis direction with respect to the fixed part 100. The first moving part 200 may be disposed inside the fixed part 100. The first moving part 200 may be movably disposed inside the fixed part 100. The first moving part 200 may be disposed to be movable in an optical axis direction inside the fixed part 100. An auto focus (AF) function may be performed by moving the first moving part 200 in an optical axis direction against the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed spaced apart from the first substrate 110. The bobbin 210 may be disposed inside the housing 130. The bobbin 210 may be disposed at an inner side of the housing 130. At least a portion of the bobbin 210 may be accommodated in the housing 130. The bobbin 210 may be movably disposed in the housing 130. The bobbin 210 may be movably disposed in the housing 130 in an optical axis direction. The bobbin 210 may be coupled to the lens 220. The bobbin 210 may comprise a hollow or hole. The lens 220 may be disposed in the hollow or hole of the bobbin 210. An outer peripheral surface of the lens 220 may be coupled to an inner peripheral surface of the bobbin 210.

The camera device 10 may comprise a lens 220. The first moving part 200 may comprise a lens 220. The lens 220 may be coupled to bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to the image sensor 330. An optical axis of the lens 220 may coincide with an optical axis of the image sensor 330. The optical axis may be a z-axis. The lens 220 may comprise a plurality of lenses. The lens 220 may comprise 5 or 6 lenses.

The camera device 10 may comprise a lens module. The lens module may be coupled to the bobbin 210. The lens module may comprise a barrel and one or more lenses 220 being disposed inside the barrel.

The camera device 10 may comprise a second moving part 300. The second moving part 300 may move against the fixed part 100. The second moving part 300 may move in a direction perpendicular to the optical axis direction with respect to the fixed part 100. The second moving part 300 may be disposed inside the fixed part 100. The second moving part 300 may be movably disposed inside the fixed part 100. The second moving part 300 may be disposed inside the fixed part 100 to be movable in a direction perpendicular to the optical axis direction. A hand shake correction function (OIS) may be performed by moving the second moving part 300 in a direction perpendicular to the optical axis direction against the fixed part 100. The second moving part 300 may be disposed between the first moving part 200 and the first substrate 110. The second moving part 300 may be disposed below the first moving part 200.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in an optical axis direction and a direction perpendicular to the optical axis direction. The second substrate 310 may move in a direction perpendicular to the optical axis direction. The second substrate 310 may be electrically connected to the image sensor 330. The second substrate 310 may move integrally with the image sensor 330. The second substrate 310 may comprise a hole. An image sensor 330 may be disposed in a hole of the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from and coupled to the sensor substrate 320. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310. The sensor substrate 320 may be disposed below the second substrate 310.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 may be coupled below the second substrate 310 with the image sensor 330 in a state being coupled thereto.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and the sensor base 350. The image sensor 330 may be electrically connected to the second substrate 310. The image sensor 330 may move integrally with the second substrate 310. The image sensor 330 may be disposed in a hole of the second substrate 310.

Light passing through the lens 220 and the filter 360 may be incident on the image sensor 330 to form an image. The image sensor 330 may be electrically connected to the sensor substrate 320, the second substrate 310 and the first substrate 110. The image sensor 330 may comprise an effective image area. The image sensor 330 may convert light irradiated onto the effective image area into an electrical signal. The image sensor 330 may comprise one or more among a charge coupled device (CCD), a metal oxide semi-conductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or hole in which the image sensor 330 is disposed. A second coil 440 may be disposed in the holder 340. The holder 340 may comprise a protrusion around which the second coil 440 is wound. The holder 340 may comprise a hole in which a Hall sensor 445 is disposed.

The camera device 10 may comprise a sensor base 350. The second moving part 300 may comprise a sensor base 350. The sensor base 350 may be disposed in the sensor substrate 320. The sensor base 350 may comprise a hole being formed at a position corresponding to the image sensor 330. The sensor base 350 may comprise a groove in which a filter 360 is disposed.

The camera device 10 may comprise a filter 360. The second moving part 300 may comprise a filter 360. The filter 360 may be disposed between the lens 220 and the image sensor 330. The filter 360 may be disposed in sensor base 350. The filter 360 may block light of a specific frequency band from entering the image sensor 330 from light passing through the lens 220. The filter 360 may comprise an infrared cut filter. The filter 360 may block infrared rays from being incident on the image sensor 330.

The camera device 10 may comprise a terminal member 370. The terminal member 370 may be an interposer. The terminal member 370 may connect the wire 800 and the second substrate 310. The terminal member 370 may electrically connect the wire 800 and the second substrate 310.

The terminal member 370 may comprise a body portion 371. The body portion 371 may be formed of an insulating material. The body portion 371 may be an insulating portion. The body portion 371 may be an insulator. However, the body portion 371 may comprise a conductive area. The body portion 371 may be disposed in the holder 340.

The terminal member 370 may comprise a terminal 372. The terminal 372 may be disposed in the body portion 371. The terminal 372 may be formed of metal. The terminal 372 may be formed of a conductive member. The terminal 372 may have elasticity at least in part.

The terminal 372 may comprise a first portion 373. The first portion 373 may be disposed in the body portion 371. The terminal 372 may comprise a second portion 374. The second portion 374 may be extended to one side from the first portion 373. The second portion 374 may be coupled to the wire 800. The second portion 374 may comprise a bent portion. The second portion 374 may have elasticity. The terminal 372 may comprise a third portion 375. The third portion 375 may extend from the first portion 373 to the other side. The third portion 375 may be coupled with the second substrate 310.

The camera device 10 may comprise a driving unit. The driving unit may move the moving parts 200 and 300 against the fixed part 100. The driving unit may perform an auto focus (AF) function. The driving unit may perform a hand shake correction (OIS) function. The driving unit may move the lens 220. The driving unit may move the image sensor 330. The driving unit may comprise a magnet and a coil. The driving unit may comprise a shape memory alloy (SMA).

The camera device 10 may comprise a first driving unit. The first driving unit may be an AF driving unit. The first driving unit may move the first moving part 200 in an optical axis direction. The first driving unit may move the bobbin 210 in an optical axis direction. The lens 220 may be moved in an optical axis direction. The first driving unit may perform an auto focus (AF) function. The first driving unit may move the first moving part 200 upward in an optical axis direction. The first driving unit may move the first moving part 200 downward in an optical axis direction. The first driving unit may comprise a first magnet 410. The first driving unit may comprise a first coil 430.

The camera device 10 may comprise a second driving unit. The second driving unit may be an OIS driving unit. The second driving unit may move the second moving part 300 in a direction perpendicular to the optical axis direction. The second driving unit may move the second substrate 310 in a direction perpendicular to the optical axis direction. The second driving unit may move the sensor substrate 320 in a direction perpendicular to the optical axis direction. The second driving unit may move the image sensor 330 in a direction perpendicular to the optical axis direction. The second driving unit may move the holder 340 in a direction perpendicular to the optical axis direction. The second driving unit may move the sensor base 350 in a direction perpendicular to the optical axis direction. The second driving unit may move the filter 360 in a direction perpendicular to the optical axis direction. The second driving unit may perform a hand shake correction (OIS) function. The second driving unit may comprise a second magnet 420. The second driving unit may comprise a second coil 440.

The second driving unit may move the second moving part 300 in a first direction perpendicular to the optical axis direction. The second driving unit may move the second moving part 300 in a second direction perpendicular to the optical axis direction and the first direction. The second driving unit may rotate the second moving part 300 about an optical axis.

The camera device 10 may comprise a first magnet 410. The driving unit may comprise a first magnet 410. The first magnet 410 may be an AF magnet. The first magnet 410 can be used for AF driving. The first magnet 410 may be a magnet. The first magnet 410 may be a permanent magnet.

The first magnet 410 may be disposed in the fixed part 100. The first magnet 410 may be fixed to the fixed part 100. The first magnet 410 may be coupled to the fixed part 100. The first magnet 410 may be attached to the fixed part 100 by an adhesive. The first magnet 410 may be disposed in the housing 130. The first magnet 410 may be fixed to the housing 130. The first magnet 410 may be coupled to the housing 130. The first magnet 410 may be attached to the housing 130 by an adhesive.

The first magnet 410 may be 2 pole magnetized magnet comprising one N-pole area and one S-pole area. As a modified embodiment, the first magnet 410 may be a 4 pole magnetized magnet comprising two N pole areas and two S pole areas.

The first magnet 410 may comprise a plurality of magnets. The first magnet 410 may comprise two magnets. Two first magnets 410 may be disposed between four second magnets 420. The first magnet 410 may comprise first and second unit magnets. The first and second unit magnets may be disposed symmetrically to an optical axis. The first and second unit magnets may be formed to have the same size and shape.

The camera device 10 may comprise a second magnet 420. The driving unit may comprise a second magnet 420. The second magnet 420 may be an OIS magnet 420. The second magnet 420 can be used for OIS driving. The second magnet 420 may be a magnet. The second magnet 420 may be a permanent magnet.

The second magnet 420 may be disposed in the fixed part 100. The second magnet 420 may be fixed to the fixed part 100. The second magnet 420 may be coupled to the fixed part 100. The second magnet 420 may be attached to the fixed part 100 by an adhesive. The second magnet 420 may be disposed in the housing 130. The second magnet 420 may be fixed to the housing 130. The second magnet 420 may be coupled to the housing 130. The second magnet 420 may be attached to the housing 130 by an adhesive. The second magnet 420 may be disposed at a corner of the housing 130. The second magnet 420 may be disposed biased toward a corner of the housing 130.

The second magnet 420 may be a 4 pole magnetized magnet comprising two N-pole areas and two S-pole areas. As a modified embodiment, the second magnet 410 may be a 2 pole magnetized magnet comprising one N pole area and one S pole area.

The second magnet 420 may comprise a plurality of magnets. The second magnet 420 may comprise four magnets. The four second magnets 420 may be disposed at each of the four corner areas of the fixed part 100. The second magnet 420 may comprise first to fourth unit magnets. The first to fourth unit magnets may be disposed symmetrically to an optical axis. The first to fourth unit magnets may be formed to have the same size and shape.

In the present embodiment, the sizes of the first magnet 410 and the second magnet 420 may be different from each other. In a direction parallel to the outer lateral surface of the first lateral wall of the fixed part 100, at least a portion of the first magnet 410 may be overlapped with the second magnet 420. At least a portion of the first magnet 410 may be overlapped with the second magnet 420 in a direction perpendicular to the optical axis. The first magnet 410 may be formed separately from the second magnet 420. The first magnet 410 may be spaced apart from the second magnet 420. The thickness of the second magnet 420 may be thinner than the thickness of the first magnet 410 in the optical axis direction. The length of the major axis of the first magnet 410 may be greater than the length of the major axis of the second magnet 420.

The first magnet 410 may comprise a first unit magnet being disposed in the central area of a first lateral wall of the fixed part 100. The second magnet 420 may comprise a first unit magnet being disposed on a first lateral wall of the fixed part 100. The first unit magnet of the first magnet 410 may be spaced apart from the first unit magnet of the second magnet 420. The first unit magnet of the first magnet 410 and the first unit magnet of the second magnet 420 may each be disposed in a direction of the major axis of the magnet. The first unit magnet of the first magnet 410 and the first unit magnet of the second magnet 420 may be disposed long in a first direction perpendicular to the optical axis direction. The second magnet 420 may comprise a second unit magnet being disposed in the first lateral wall of the fixed part 100. The first unit magnet of the first magnet 410 may be disposed between the first unit magnet and the second unit magnet of the second magnet 420. The second unit magnet of the second magnet 420 may be disposed in the first lateral wall of the fixed part 100 in the minor axis direction. The second unit magnet of the second magnet 420 may be disposed long in a second direction perpendicular to the optical axis direction and the first direction. That is, the first unit magnet and the second unit magnet of the second magnet 420 may be disposed in different directions. In a direction parallel to the outer lateral surface of the first lateral wall of the fixed part 100, the shortest distance between the first unit magnet of the first magnet 410 and the first unit magnet of the second magnet 420 may be smaller than the shortest distance between the first unit magnet of the first magnet 410 and the second unit magnet of the second magnet 420. Conversely, in a direction parallel to the outer lateral surface of the first lateral wall of the fixed part 100, the shortest distance between the first unit magnet of the first magnet 410 and the first unit magnet of the second magnet 420 may be larger than the shortest distance between the first unit magnet of the first magnet 410 and the second unit magnet of the second magnet 420.

Two of the four second magnets 420 may be disposed in the first lateral wall of the housing 130, and the remaining two may be disposed in the second lateral wall at an opposite side. The separation distance between the unit magnet of the first magnet 410 and the unit magnet of the second magnet 420 may be different at both sides of the unit magnet of the first magnet 410.

With respect to the minor axis of the first unit magnet of the first magnet 410, the first unit magnet of the first magnet 410 may be overlapped with the first unit magnet of the second magnet 420 by more than 60%. The first magnet 410 and the second magnet 420 may be spaced apart by more than 0.3 mm.

In the present embodiment, the first magnet 410 and the second magnet 420 may be disposed together in the housing 130 being formed as one piece. At this time, the first magnet 410 may be disposed in a first area of the first lateral wall of the housing 130, and the second magnet 420 may be disposed in a second area of the first lateral wall of the housing 130. The first area of the housing 130 may comprise the center area of the first lateral wall of the housing 130 in a direction parallel to the optical axis direction. The second area of the housing 130 may comprise a corner area of the first lateral wall of the housing 130 in a direction parallel to the optical axis direction. The second area may comprise the surrounding area of the first lateral wall.

In the present embodiment, VCM (voice coil motor) can be integrated into one VCM by integrating the parts where the first magnet 410 and the second magnet 420 are assembled. The present embodiment may comprise a structure that implements lens driving (AF) and image sensor driving (OIS) with two VCMs inside a one-body actuator. In the present embodiment, material cost savings can be expected through integration of magnet support components. In addition, it is possible to reduce the height dimension through actuator integration. That is, the shoulder height of the camera device 10 can be reduced.

In a modified embodiment, the first magnet 410 and the second magnet 420 can be disposed in the moving parts 200 and 300, and the first coil 430 and the second coil 440 can be disposed in the fixed part 100.

The camera device 10 may comprise a first coil 430. The driving unit may comprise the first coil 430. The first coil 430 may be an AF coil. The first coil 430 may be used for AF driving. The first coil 430 may be disposed in the first moving part 200. The first coil 430 may be fixed to the first moving part 200. The first coil 430 may be coupled to the first moving part 200. The first coil 430 may be attached to the first moving part 200 by an adhesive. The first coil 430 may be disposed on the bobbin 210. The first coil 430 may be fixed to the bobbin 210. The first coil 430 may be coupled to the bobbin 210. The first coil 430 may be attached to the bobbin 210 by an adhesive. The first coil 430 may be disposed around the outer peripheral surface of the bobbin 210. The first coil 430 may be electrically connected to a driver IC 480. The first coil 430 may be electrically connected to the lower elastic member 720, the sensing substrate 470 and the driver IC 480. The first coil 430 may receive current from the driver IC 480.

The first coil 430 may be disposed at a position corresponding to the first magnet 410. The first coil 430 may be disposed on the bobbin 210 at a position corresponding to the first magnet 410. The first coil 430 may face the first magnet 410. The first coil 430 may comprise a surface facing the first magnet 410. The first coil 430 may be disposed adjacent to the first magnet 410. The first coil 430 may interact with the first magnet 410. The first coil 430 may interact with the first magnet 410 electromagnetically.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 upward in an optical axis direction. The first coil 430 may move the bobbin 210 upward in an optical axis direction. The first coil 430 may move the lens 220 upward in an optical axis direction. The first coil 430 may move the first moving part 200 downward in an optical axis direction. The first coil 430 may move the bobbin 210 downward in an optical axis direction. The first coil 430 may move the lens 220 in a downward direction of the optical axis direction. The first coil 430 can move the first moving part 200 in an optical axis direction through interaction with the first magnet 410.

The camera device 10 may comprise a second coil 440. The driving part may comprise a second coil 440. The second coil 440 may be disposed in the second moving part 300. The second coil 440 may be fixed to the second moving part 300. The second coil 440 may be coupled to the second moving part 300. The second coil 440 may be attached to the second moving part 300 by an adhesive. The second coil 440 may be disposed in the holder 340. The second coil 440 may be fixed to the holder 340. The second coil 440 may be coupled to the holder 340. The second coil 440 may be attached to the holder 340 by an adhesive. The second coil 440 may be disposed by being wound around a protrusion of the holder 340. The second coil 440 may be disposed on the holder 340. The second coil 440 may be electrically connected to the second substrate 310. Both ends of the second coil 440 may be soldered to the second substrate 310. The second coil 440 may be electrically connected to the driver IC 495. The second coil 440 may be electrically connected to the second substrate 310 and the driver IC 495. The second coil 440 may receive current from the driver IC 495.

The second coil 440 may be disposed at a position corresponding to the second magnet 420. The second coil 440 may be disposed at a position corresponding to the second magnet 420 in the holder 340. The second coil 440 may be disposed at a position corresponding to the second magnet 420 in the second moving part 300. The second coil 440 may face the second magnet 420. The second coil 440 may comprise a surface facing the second magnet 420. The second coil 440 may be disposed adjacent to the second magnet 420. The second coil 440 may interact with the second magnet 420. The second coil 440 may electromagnetically interact with the second magnet 420.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about an optical axis. The second coil 440 may rotate the second substrate 310 about an optical axis. The second coil 440 may rotate the sensor substrate 320 about an optical axis. The second coil 440 may rotate the image sensor 330 about an optical axis. The second coil 440 may rotate the holder 340 about an optical axis. The second coil 440 can move the second moving part 300 in a direction perpendicular to the optical axis through interaction with the second magnet 420 and rotate it with respect to the optical axis.

The second coil 440 may comprise a plurality of coils. The second coil 440 may comprise four coils. The second coil 440 may comprise a coil for x-axis shift. The second coil 440 may comprise a coil for y-axis shift.

The second coil 440 may comprise a second-first coil 441. The second-first coil 441 may be a first unit coil. The second-first coil 441 may be a first sub coil. The second-first coil 441 may be a coil for x-axis shift. The second-first coil 441 may move the second moving part 300 in an x-axis direction. The second-first coil 441 may be disposed long in a y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, two coils of the second-first coil 441 may receive current together. Alternatively, the two coils of the second-first coil 441 may be electrically separated from each other and receive current individually.

The second coil 440 may comprise a second-second coil 442. The second-second coil 442 may be a second sub coil. The second-second coil 442 may be a coil for y-axis shift. The second-second coil 442 may move the second moving part 300 in a y-axis direction. The second-second coil 442 may be disposed long in an x-axis. The second-first coil 441 may comprise a plurality of coils. The second-second coil 442 may comprise two coils. The two coils of the second-second coil 442 may be electrically connected to each other. The second-second coil 442 may comprise a connection coil connecting the two coils. In this case, two coils of the second-second coil 442 may receive current together. Alternatively, the two coils of the second-second coil 442 may be electrically separated from each other and receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall element (Hall IC). The Hall sensor 445 may detect the second magnet 420. The Hall sensor 445 may detect the magnetic force of the second magnet 420. The Hall sensor 445 may face the second magnet 420. The Hall sensor 445 may be disposed at a position corresponding to the second magnet 420. The Hall sensor 445 may be disposed adjacent to the second magnet 420. The Hall sensor 445 may detect the position of the second moving part 300. The Hall sensor 445 may detect the movement of the second moving part 300. The Hall sensor 445 may be disposed in the hollow of the second coil 440. A sensing value detected by the Hall sensor 445 may be used to provide feedback for hand shake correction driving. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect displacement of the second moving part 300 in an x-axis direction. The second Hall sensor may detect displacement of the second moving part 300 in a y-axis direction. The third Hall sensor may detect the rotation of the second moving part 300 about a z-axis either alone or together with one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 by an adhesive. The sensing magnet 450 may be disposed on the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the driving magnets 410 and 420. Through this, the influence of the sensing magnet 450 on driving may be minimized.

The sensing magnet 450 may be disposed at an opposite side of the correction magnet 460. The sensing magnet 450 and the correction magnet 460 may be disposed at opposite sides in the first moving part 200. The sensing magnet 450 and the correction magnet 460 may be disposed opposite to each other on the bobbin 210.

The camera device 10 may comprise a correction magnet 460. The correction magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 by an adhesive. The correction magnet 460 may be disposed on the bobbin 210. The correction magnet 460 may be fixed to the bobbin 210. The correction magnet 460 may be coupled to the bobbin 210. The correction magnet 460 may be attached to the bobbin 210 by an adhesive. The correction magnet 460 may be formed to have a smaller size than the driving magnets 410 and 420. Through this, the influence of the correction magnet 460 on driving may be minimized. In addition, the correction magnet 460 may be disposed at an opposite side of the sensing magnet 450 to form a magnetic balance with the sensing magnet 450. Through this, tilt that may be generated by the sensing magnet 450 may be prevented.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled to the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole having a shape corresponding to that of the sensing substrate 470. The sensing substrate 470 may be disposed in a groove or hole of the housing 130.

The camera device 10 may comprise a driver IC 480. The driver IC 480 may be an AF driver IC. The driver IC 480 may be electrically connected to the first coil 430. The driver IC 480 may apply current to the first coil 430 to perform AF driving. The driver IC 480 may apply power to the first coil 430. The driver IC 480 may apply current to the first coil 430. The driver IC 480 may apply a voltage to the first coil 430. The driver IC 480 may be disposed in the sensing substrate 470. The driver IC 480 may be disposed at a position corresponding to the sensing magnet 450. The driver IC 480 may be disposed to face the sensing magnet 450. The driver IC 480 may be disposed adjacent to the sensing magnet 450. The driver IC 480 can detect the sensing magnet 450.

The driver IC 480 may comprise a sensor. The sensor may comprise a Hall element (Hall IC). The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect movement of the first moving part 200. A detection value detected by the sensor may be used for feedback of autofocus driving.

The camera device 10 may comprise a gyro sensor 490. The gyro sensor 490 may be disposed in the first substrate 110. The gyro sensor 490 may detect shaking of the camera device 10. The gyro sensor 490 may sense angular velocity or linear velocity due to shaking of the camera device 10. The gyro sensor 490 may be electrically connected to the driver IC 495. Shaking of the camera device 10 detected by the gyro sensor 490 may be used for hand shake correction (OIS) driving.

The camera device 10 may comprise a driver IC 495. The driver IC 495 may be an OIS driver IC. The driver IC 495 may be electrically connected to the second coil 440. The driver IC 495 may apply current to the second coil 440 to perform OIS driving. The driver IC 495 may apply power to the second coil 440. The driver IC 495 may apply current to the second coil 440. The driver IC 495 may apply a voltage to the second coil 440. The driver IC 495 may be disposed in the second substrate 310.

The camera device 10 may comprise an interposer. The interposer can movably support the second moving part 300. The interposer may be electrically connected to the image sensor 330. The interposer may provide a conductive line connecting the image sensor 330 to the outside. The interposer may comprise a wire 800.

In a modified embodiment, the camera device 10 may comprise a connecting substrate (not shown). The interposer may be a connecting substrate. The connecting substrate may be a connection part. The connecting substrate may be a connection member. The connecting substrate may be a flexible board. The connecting substrate may be a flexible board. The connecting substrate may be a flexible printed circuit board. The connecting substrate may be a flexible printed circuit board (FPCB). The connecting substrate may have ductility at least in part. The second substrate 310 and the connecting substrate may be formed integrally. The connecting substrate may connect the second substrate 310 and the first substrate 110. The connecting substrate may electrically connect the second substrate 310 and the first substrate 110.

The connecting substrate may support the second moving part 300. The connecting substrate may support the movement of the second moving part 300. The connecting substrate may movably support the second moving part 300. The connecting substrate may connect the second moving part 300 and the fixed part 100. The connecting substrate may connect the first substrate 110 and the second substrate 310. The connecting substrate may electrically connect the first substrate 110 and the second substrate 310. The connecting substrate may guide the movement of the second moving part 300. The connecting substrate may guide the second moving part 300 to move in a direction perpendicular to the optical axis direction. The connecting substrate may guide the second moving part 300 to rotate about an optical axis. The connecting substrate may limit the movement of the second moving part 300 in an optical axis direction. A portion of the connecting substrate may be coupled to the base 120.

The connecting substrate may comprise a first portion being coupled to the first substrate 110, a second portion being coupled to the second substrate 310, and a third portion connecting the first portion and the second portion. The third portion may be disposed at least partially parallel to an optical axis. The third portion may be formed so that the length in an optical axis direction is longer than the thickness. The second portion of the connecting substrate may be disposed at least partially in parallel with the second substrate 310. The third portion of the connecting substrate may be disposed perpendicular to a second portion at least in part. The third portion of the connecting substrate may be bent roundly at a portion corresponding to a corner of the second substrate 310.

The camera device 10 may comprise an elastic member 700. The elastic member 700 may be a support member. The elastic member 700 can connect the fixed part 100 and the first moving part 200. The elastic member 700 can elastically connect the fixed part 100 and the first moving part 200. The elastic member 700 can connect the bobbin 210 and the housing 130. The elastic member 700 can elastically connect the bobbin 210 and the housing 130. The elastic member 700 can movably support the first moving part 200 with respect to the fixed part 100. The elastic member 700 may be deformed when the first moving part 200 moves. When the movement of the first moving part 200 is completed, the elastic member 700 can position the first moving part 200 to the initial position through restoring force (elastic force). The elastic member 700 may comprise a leaf spring. The elastic member 700 may comprise a spring. The elastic member 700 may have elasticity at least in part. The elastic member 700 can provide restoring force (elastic force) to the first moving part 200.

The camera device 10 may comprise an upper elastic member 710. The elastic member 700 may comprise an upper elastic member 710. The upper elastic member 710 may be disposed above the lower elastic member 720. The upper elastic member 710 may comprise an inner side portion being coupled to the bobbin 210. The inner side portion of the upper elastic member 710 may be coupled to an upper portion of the bobbin 210. The inner side portion of the upper elastic member 710 may be disposed on an upper surface of the bobbin 210. The upper elastic member 710 may comprise an outer side portion being coupled to the housing 130. The outer side portion of the upper elastic member 710 may be coupled to a lower portion of the housing 130. The outer side portion of the upper elastic member 710 may be disposed on a lower surface of the housing 130. The upper elastic member 710 may comprise a connecting portion connecting the inner side portion and the outer side portion. The connecting portion may have elasticity.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion being coupled to the bobbin 210. The inner side portion of the lower elastic member 720 may be coupled to a lower portion of the bobbin 210. The inner side portion of the lower elastic member 720 may be disposed on a lower surface of the bobbin 210. The lower elastic member 720 may comprise an outer side portion being coupled to the housing 130. The outer side portion of the lower elastic member 720 may be coupled to an upper portion of the housing 130. The outer side portion of the lower elastic member 720 may be disposed on an upper surface of the housing 130. The lower elastic member 720 may comprise a connection part connecting the inner side portion and the outer side portion. The connection part may have elasticity.

The lower elastic member 720 may comprise a plurality of lower elastic units. The lower elastic member 720 may comprise first and second lower elastic units 720-1 and 720-2. The lower elastic member 720 may comprise two lower elastic units 720-1 and 720-2. The two lower elastic units 720-1 and 720-2 are spaced apart from each other and can electrically connect the sensing substrate 470 and the first coil 430. The lower elastic member 720 may comprise two lower elastic members 720. The two lower elastic members 720 may electrically connect the sensing substrate 470 and the first coil 430.

The camera device 10 may comprise a wire 800. The wire 800 may be a wire spring. The wire 800 may be an elastic member. The wire 800 may be a leaf spring in a modified embodiment. The wire 800 can connect the fixed part 100 and the second moving part 300. The wire 800 can elastically connect the fixed part 100 and the second moving part 300. The wire 800 can connect the housing 130 and the second substrate 310. The wire 800 can elastically connect the housing 130 and the second substrate 310. The wire 800 can movably support the second moving part 300. The wire 800 can support the second moving part 300 to move or rotate in a direction perpendicular to the optical axis direction. The wire 800 may be disposed in an optical axis direction. The wire 800 may be disposed parallel to an optical axis. The wire 800 may be formed of metal. The wire 800 may be formed of a conductive material. The wire 800 may have elasticity at least in part. The wire 800 may comprise a plurality of wires. The wire 800 may comprise 36 wires.

Hereinafter, operation of the camera device according to the present embodiment will be described with reference to the drawings.

Figure 14:
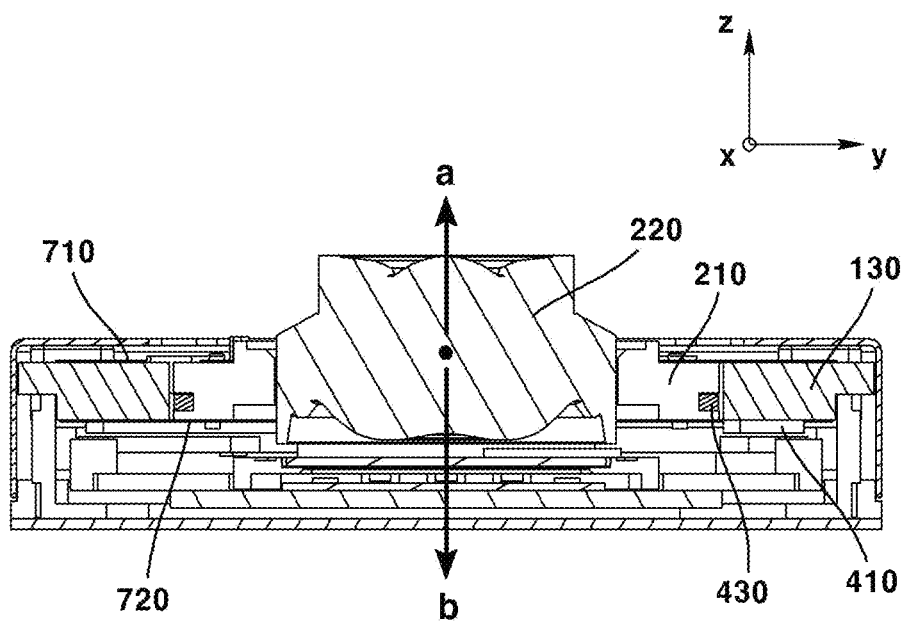
FIG. 14 is a diagram for explaining the driving of an autofocus function of a camera device according to the present embodiment.

FIG. 14 is a diagram for explaining the driving of an autofocus function of a camera device according to the present embodiment.

When power is applied to the first coil 430 of a camera device 10 according to a first embodiment of the present invention, an electromagnetic field is formed in the first coil 430, and the first coil 430 can move in an optical axis direction (z-axis direction) through electromagnetic interaction with first magnet 410. At this time, the first coil 430 may move in an optical axis direction together with the first moving part 200 comprising the lens 220. In this case, the lens 220 moves away from or approaches the image sensor 330, so the focus of the subject can be adjusted. To apply power to the first coil 430, any one or more of current and voltage may be applied.

When a current in a first direction is applied to a first coil 430 of a camera device 10 according to the present invention, the first coil 430 can move in an upward direction (refer to a in FIG. 14) of the optical axis direction. At this time, the first coil 430 can move the lens 220 in an upward direction of optical axis direction to be away from the image sensor 330.

When a current in a second direction opposite to the first direction is applied to the first coil 430 of a camera device 10 according to a first embodiment of the present invention, the first coil 430 can move in a downward direction (refer to b in FIG. 14) of the optical axis direction through electromagnetic interaction with the first magnet 410. At this time, the first coil 430 can move the lens 220 downward in an optical axis direction to become closer to the image sensor 330.

Figure 15:
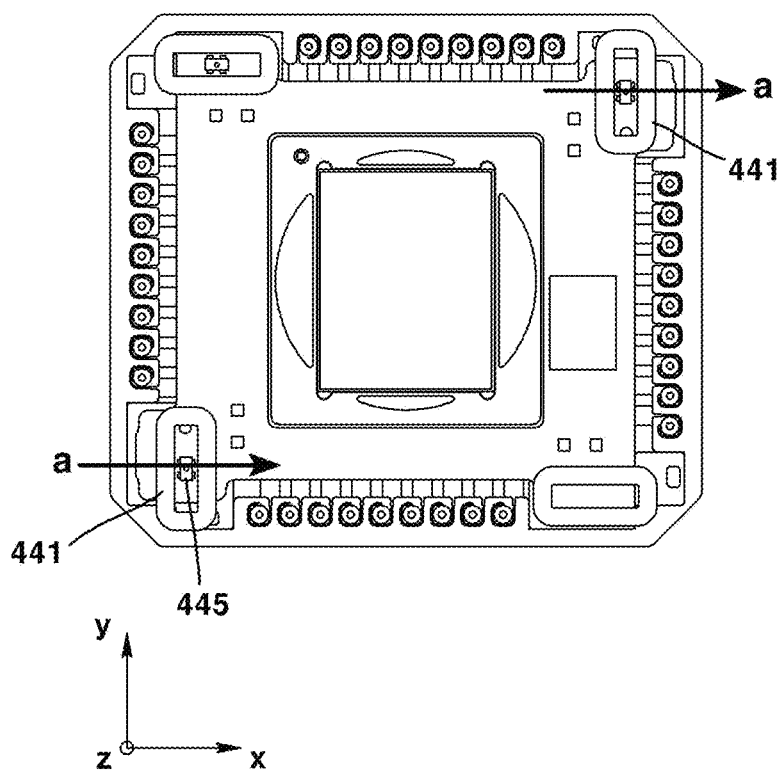
FIGS. 15 to 17 are diagrams for explaining the operation of the hand shake correction function of a camera device according to the present embodiment. In more detail.
Figure 16:
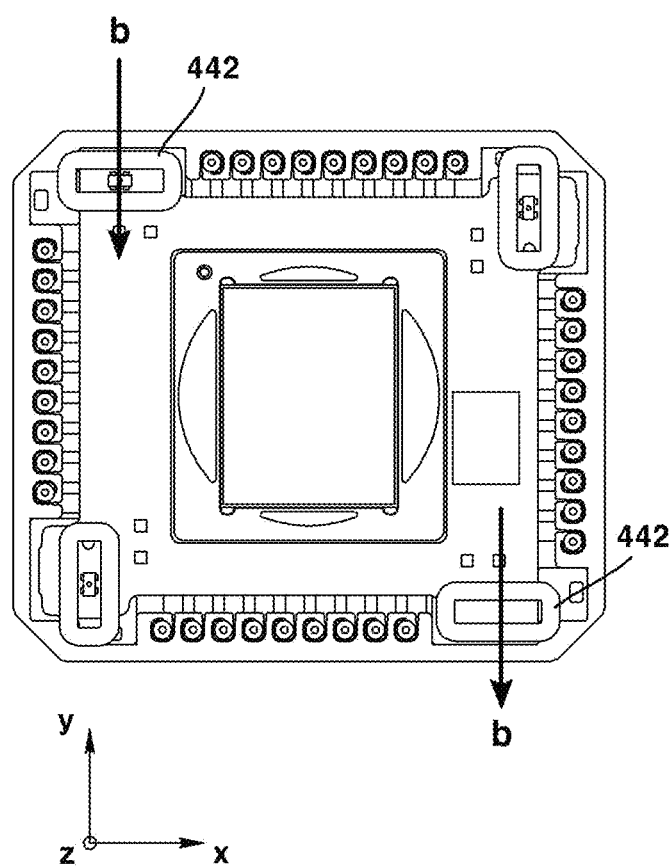
Figure 17:
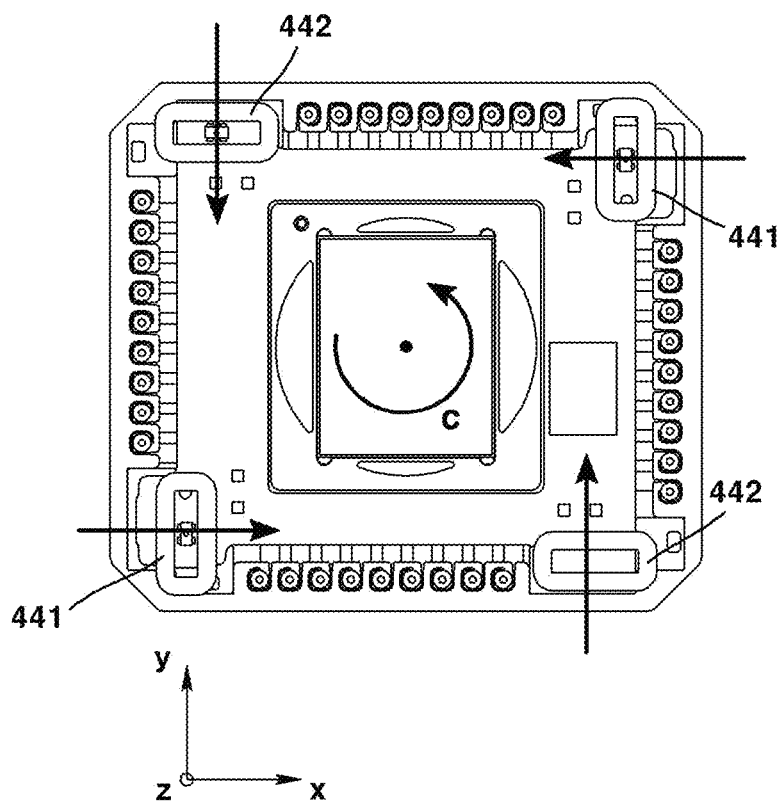

FIGS. 15 to 17 are diagrams for explaining the operation of the hand shake correction function of a camera device according to the present embodiment.

When power is applied to the second coil 440 of a camera device 10 according to a first embodiment of the present invention, an electromagnetic field is formed in the second coil 440, and the second coil 440 can move in a direction perpendicular to the optical axis direction through electromagnetic interaction with the second magnet 420. In addition, the second coil 440 can rotate about an optical axis through electromagnetic interaction with the second magnet 420. At this time, the second coil 440 may move or rotate together with the second moving part 300 comprising the image sensor 330. In a first embodiment of the present invention, the second coil 440 can move the image sensor 330 so as to compensate for the shaking of the camera device 10 being detected by the gyro sensor.

FIG. 15 is a diagram illustrating driving in which an image sensor of a camera device according to the present embodiment is shifted along an x-axis.

When a current in a first direction is applied to the second-first coil 441 of a camera device 10 according to a first embodiment of the present invention, the second-first coil 441 can move in one direction (refer to a in FIG. 15) of the first direction (x-axis direction) perpendicular to the optical axis direction through electromagnetic interaction with driving magnet 410. At this time, the second-first coil 441 can move the image sensor 330 in one of the first direction perpendicular to the optical axis direction. Conversely, when a current in a second direction opposite to the first direction is applied to the second-first coil 441, the second-first coil 441 can move in another direction of the first direction (x-axis direction) perpendicular to the optical axis direction through electromagnetic interaction with driving magnet 410. At this time, the second-first coil 441 can move the image sensor 330 in another direction of the first direction perpendicular to the optical axis direction.

FIG. 16 is a diagram illustrating driving in which an image sensor of a camera device is shifted along a y-axis according to the present embodiment.

When a current in a first direction is applied to the second-second coil 442 of a camera device 10 according to a first embodiment of the present invention, the second-second coil 442 can move in one direction (refer to b in FIG. 16) of the second direction (y-axis direction) perpendicular to the optical axis direction through electromagnetic interaction with the second magnet 420. At this time, the second-second coil 442 can move the image sensor 330 in one of the first direction perpendicular to the optical axis direction. Conversely, when a current in a second direction opposite to the first direction is applied to the second-second coil 442, the second-second coil 442 can move in another direction of the second direction (y-axis direction) perpendicular to the optical axis direction through electromagnetic interaction with second magnet 420. At this time, the second-second coil 442 can move the image sensor 330 in another direction of the second direction perpendicular to the optical axis direction.

FIG. 17 is a diagram for explaining the driving in which an image sensor of a camera device according to the present embodiment is rolling about a z-axis.

When a current in a first direction is applied to the second-first coil 441 and the second-second coil 442 of a camera device 10 according to a second embodiment of the present invention, the second-first coil 441 and the second-second coil 442 can rotate in one direction about an optical axis through electromagnetic interaction with the second magnet 420 (refer to c in FIG. 17). At this time, the second-first coil 441 and the second-second coil 442 can rotate the image sensor 330 in one direction about the optical axis. At this time, one direction may be counterclockwise. Conversely, when a current in a second direction opposite to the first direction is applied to the second-first coil 441 and the second-second coil 442, the second-first coil 441 and the second-second coil 442 can rotate in other directions about an optical axis through electromagnetic interaction with the drive magnet 410. At this time, the second-first coil 441 and the second-second coil 442 can rotate the image sensor 330 in the other direction about the optical axis. At this time, the other direction may be a clockwise direction.

Hereinafter, an optical device according to the present invention will be described with reference to the drawings.

Figure 18:
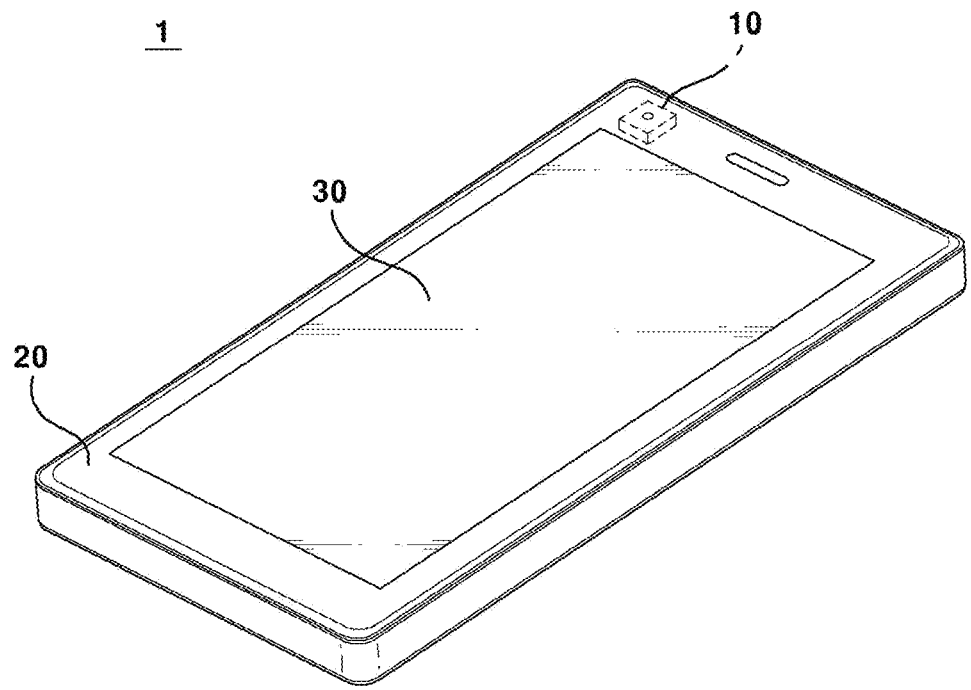
FIG. 18 is a perspective view of an optical device according to the present embodiment.
Figure 19:
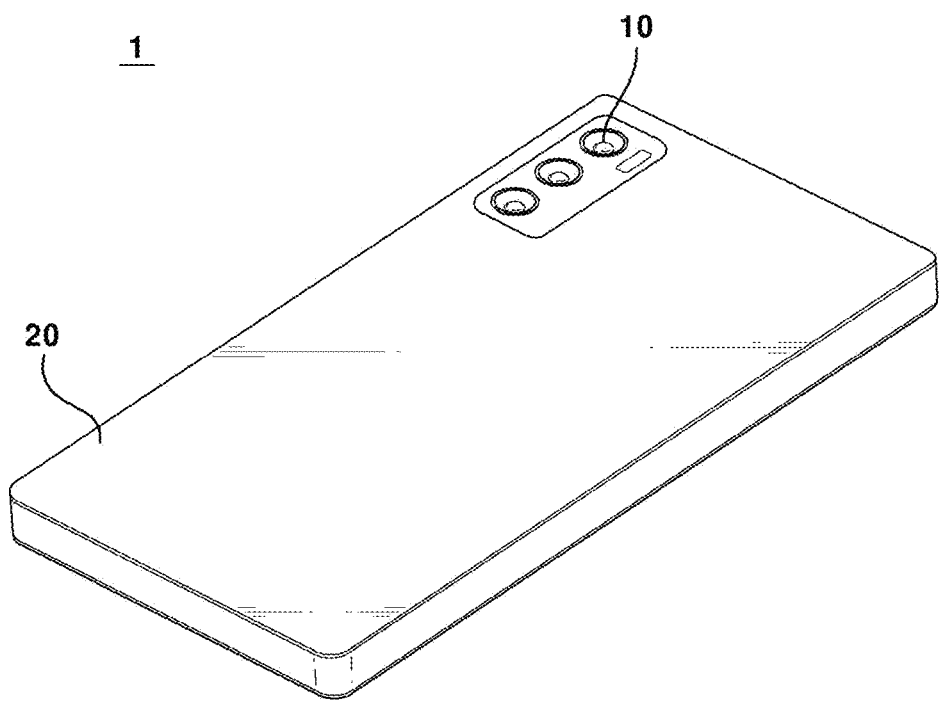
FIG. 19 is a perspective view of an optical device according to the present embodiment viewed from a direction different from that of FIG. 18.

FIG. 18 is a perspective view of an optical device according to the present embodiment; and FIG. 19 is a perspective view of an optical device according to the present embodiment viewed from a direction different from that of FIG. 18.

The optical device 1 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical device 1 may comprise any device for photographing videos or photos.

The optical device 1 may comprise a main body 20. The optical device 1 may comprise a camera device 10. The camera device 10 may be disposed on the main body 20. The camera device 10 can photograph a subject. The optical device 1 may comprise a display 30. The display 30 may be disposed in the main body 20. The display 30 can output any one or more of images and images photographed by the camera device 10. The display 30 may be disposed on a first surface of the main body 20. The camera device 10 may be disposed on at least one of a first surface of the main body 20 and a second surface opposite to the first surface.

Although the embodiment of the present invention has been described above with reference to the accompanying drawings, those of ordinary skill in the art to which the present invention belongs will understand that the present invention may be embodied in other specific forms without changing the technical spirit or essential features thereof.

Therefore, it should be understood that the embodiments described above are illustrative in all respects and not restrictive.

The invention claimed is:
1. A camera device comprising:
a fixed part;
a first moving part disposed in the fixed part and comprising a lens;
a second moving part disposed below the first moving part and comprising an image sensor;
a first magnet and a second magnet disposed on the fixed part;
a first coil disposed on the first moving part at a position corresponding with the first magnet; and
a second coil disposed on the second moving part at a position corresponding with the second magnet,
wherein sizes of the first magnet and the second magnet are different, and
wherein at least a portion of the first magnet is overlapped with the second magnet in a direction parallel to an outer lateral surface of a first lateral wall of the fixed part.

2. The camera device of claim 1, wherein the first magnet is formed separately from the second magnet to be spaced apart from the second magnet.

3. The camera device of claim 1, wherein, in an optical axis direction, a thickness of the second magnet is thinner than a thickness of the first magnet.

4. The camera device of claim 1, wherein the second magnet comprises four second magnets and the first magnet comprises two first magnets,
wherein the four second magnets are disposed on four corner areas of the fixed part, respectively, and
wherein the two first magnets are disposed between the four second magnets.

5. The camera device of claim 1, wherein the fixed part comprises a base and a housing fixed to the base,
wherein the first magnet and the second magnet are disposed on the housing, and
wherein the housing is integrally formed.

6. The camera device of claim 5, wherein the first moving part comprises a bobbin coupled with the lens, and
wherein the first coil is disposed around an outer peripheral surface of the bobbin.

7. The camera device of claim 6, comprising:
an upper elastic member and a lower elastic member connecting the housing and the bobbin,
wherein the lower elastic member is disposed below the upper elastic member.

8. The camera device of claim 7, comprising:
a sensing magnet and a correction magnet disposed opposite to each other on the first moving part;
a sensing substrate; and
a driver IC disposed on the sensing substrate and comprising a sensor configured to detect the sensing magnet.

9. The camera device of claim 8, wherein the lower elastic member comprises two lower elastic members spaced apart from each other, and
wherein the two lower elastic members electrically connect the sensing substrate and the first coil.

10. The camera device of claim 1, comprising a first substrate and a wire,
wherein the second moving part comprises a second substrate electrically connected with the image sensor, and
wherein the wire electrically connects the first substrate and the second substrate.

11. The camera device of claim 10, wherein the second moving part comprises a holder disposed on the second substrate, and
wherein the second coil is disposed on the holder and coupled with the second substrate by a solder.

12. The camera device of claim 11, wherein the second moving part comprises a body portion disposed on the holder and a terminal member comprising a terminal disposed on the body portion, and
wherein the terminal comprises a first portion disposed on the body portion, a second portion extending from the first portion to one side and coupled with the wire, and a third portion extending from the first portion to an other side and coupled with the second substrate.

13. The camera device of claim 10, wherein the second moving part comprises a sensor substrate disposed below the second substrate,
wherein the second substrate comprises a hole, and
wherein the image sensor is disposed on the sensor substrate and is disposed on the hole of the second substrate.

14. The camera device of claim 1, wherein the first coil is configured to move the first moving part in an optical axis direction through interaction with the first magnet, and
wherein the second coil is configured to move the second moving part in a direction perpendicular to the optical axis direction and rotate the second moving part about an optical axis through interaction with the second magnet.

15. An optical device comprising:
a main body;
the camera device of claim 1 disposed on the main body; and
a display disposed on the main body and configured to output a video or an image photographed by the camera device.

16. A camera device comprising:
a housing;
a bobbin disposed in the housing;
a lens coupled with the bobbin;
an image sensor disposed at a position corresponding with the lens;
a first driving unit configured to move the lens in an optical axis direction and comprising a first magnet; and
a second driving unit configured to move the image sensor in a direction perpendicular to the optical axis direction and comprising a second magnet,
wherein the first magnet is disposed on a first area of a first lateral wall of the housing,
wherein the second magnet is disposed on a second area of the first lateral wall of the housing, and
wherein a length of a major axis of the first magnet is greater than a length of a major axis of the second magnet.

17. The camera device of claim 16, wherein at least a portion of the first magnet is overlapped with the second magnet in a direction parallel to an outer lateral surface of the first lateral wall of the housing.

18. The camera device of claim 16, wherein the first area comprises a central area of the first lateral wall of the housing in a direction parallel to the optical axis direction.

19. The camera device of claim 16, wherein the first magnet has two polarities, and
wherein the second magnet has four polarities.

20. A camera device comprising:
a fixed part;
a first moving part disposed in the fixed part and comprising a lens;
a second moving part disposed below the first moving part and comprising an image sensor;
a first magnet and a second magnet disposed on the fixed part;
a first coil disposed on the first moving part at a position corresponding with the first magnet; and
a second coil disposed on the second moving part at a position corresponding with the second magnet,
wherein the first magnet comprises a first unit magnet disposed in a central area of the first lateral wall of the fixed part,
wherein the second magnet comprises a first unit magnet disposed in the first lateral wall of the fixed part, and
wherein the first unit magnet of the first magnet is spaced apart from the first unit magnet of the second magnet.

* * * * *